United States Patent
Reddy Byreddy et al.

(10) Patent No.: US 8,682,998 B2
(45) Date of Patent: Mar. 25, 2014

(54) METHOD AND SERVER CLUSTER FOR MAP REDUCING FLOW SERVICES AND LARGE DOCUMENTS

(75) Inventors: Bhaskar Reddy Byreddy, Bangalore (IN); Ramu Ramaiah, Bangalore (IN); Vinay Punnoose, Bangalore (IN)

(73) Assignee: Software AG, Darmstadt (DE)

( * ) Notice: Subject to any disclaimer, the term of this patent is extended or adjusted under 35 U.S.C. 154(b) by 117 days.

(21) Appl. No.: 12/314,607

(22) Filed: Dec. 12, 2008

(65) Prior Publication Data

US 2010/0115046 A1    May 6, 2010

(30) Foreign Application Priority Data

Oct. 31, 2008  (IN) .......................... 1869/KOL/2008

(51) Int. Cl.
*G06F 15/16* (2006.01)
*G06F 9/30* (2006.01)
*G06F 9/46* (2006.01)

(52) U.S. Cl.
USPC ........................... 709/208; 712/203; 718/105

(58) Field of Classification Search
USPC ....................................................... 709/208
See application file for complete search history.

(56) References Cited

U.S. PATENT DOCUMENTS

| | | | | |
|---|---|---|---|---|
| 5,337,360 A * | 8/1994 | Fischer | ......................... | 713/176 |
| 6,092,189 A * | 7/2000 | Fisher et al. | ......................... | 713/1 |
| 6,289,334 B1 * | 9/2001 | Reiner et al. | ......................... | 1/1 |
| 6,314,468 B1 * | 11/2001 | Murphy et al. | ............... | 709/236 |
| 6,751,787 B1 * | 6/2004 | Blaszczak et al. | ............ | 717/105 |
| 7,043,687 B2 * | 5/2006 | Knauss et al. | ................ | 715/236 |
| 7,650,331 B1 * | 1/2010 | Dean et al. | ..................... | 712/203 |
| 2002/0010659 A1 * | 1/2002 | Cruse et al. | ...................... | 705/28 |
| 2002/0083099 A1 * | 6/2002 | Knauss et al. | ................ | 707/513 |
| 2003/0041124 A1 * | 2/2003 | Navarre et al. | ................ | 709/219 |
| 2007/0038659 A1 | 2/2007 | Datar et al. | | |
| 2007/0143665 A1 * | 6/2007 | Machiraju et al. | ............ | 715/513 |
| 2007/0203926 A1 * | 8/2007 | Gaurav et al. | ................ | 707/101 |
| 2007/0299811 A1 * | 12/2007 | Chandrasekar et al. | .......... | 707/2 |
| 2008/0082374 A1 | 4/2008 | Kennis et al. | | |
| 2008/0086442 A1 * | 4/2008 | Dasdan et al. | ..................... | 707/1 |
| 2008/0098353 A1 * | 4/2008 | Hambleton et al. | .......... | 717/109 |
| 2008/0120314 A1 | 5/2008 | Yang et al. | | |
| 2008/0168109 A1 * | 7/2008 | Gaurav et al. | ................ | 707/203 |
| 2009/0019072 A1 * | 1/2009 | Chen et al. | ..................... | 707/101 |
| 2009/0313635 A1 * | 12/2009 | Dasdan | ......................... | 718/105 |
| 2010/0122065 A1 * | 5/2010 | Dean et al. | ..................... | 712/203 |
| 2011/0004513 A1 * | 1/2011 | Hoffberg | ..................... | 705/14.1 |

OTHER PUBLICATIONS

"MapReduce: Simplified Data Processing on Large Clusters", Dean et al., 6th Symposium on Operating System Design and Implementation, Dec. 6, 2004, pp. 1-13.

(Continued)

*Primary Examiner* — Lynn Feild
*Assistant Examiner* — James Edwards
(74) *Attorney, Agent, or Firm* — Nixon & Vanderhye PC

(57) ABSTRACT

The present invention refers to a method for MapReducing the processing of an Electronic Data Interchange (EDI) document (1, the method comprising the following steps:
a. mapping the EDI document (1) into a plurality of intermediate documents (10, 11);
b. processing the intermediate documents (10, 11) to produce a plurality of intermediate results (20-23);
c. reducing the plurality of intermediate results (20-23) to produce a plurality of reduced intermediate results (30, 31); and
d. reducing the reduced intermediate results (30, 31) to produce a final result (2) representing the processed EDI document (1).

14 Claims, 6 Drawing Sheets

(56) References Cited

OTHER PUBLICATIONS

Figure 1:
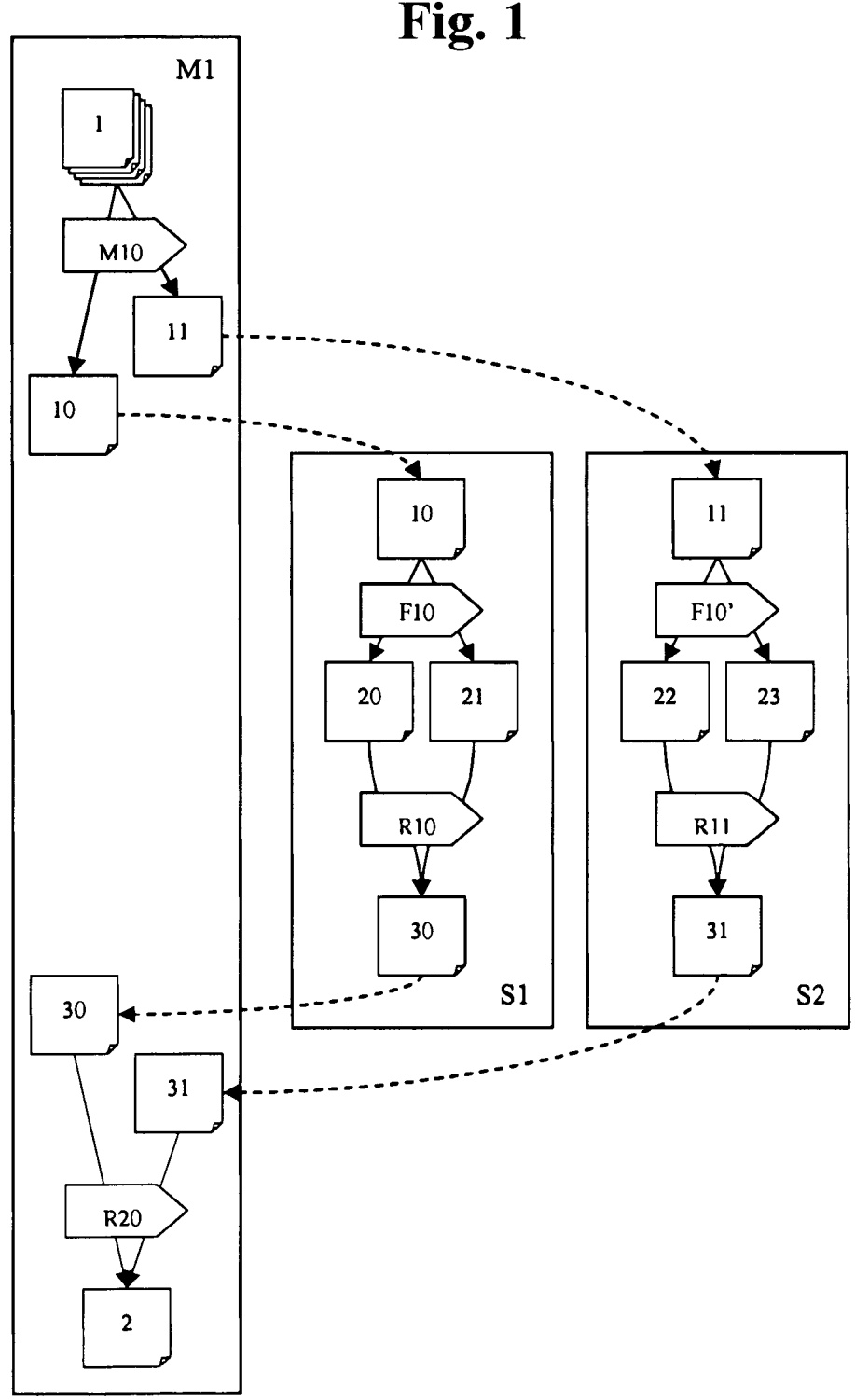

"Towards Large Scale Semantic Annotation Build on MapReduce Architecture", Laclavak et al., Computational Science A ICCS 2008 vol. 5103, Jun. 23, 2008.

English Translation of Chinese Office Action issued in CN 200910207939.4 on Jun. 5, 2012, pp. 1-10.

Zhizheng Wan, The Design and Implementation of Parallel Computing Platform Based on MapReduce, Master's Thesis, ZheJiang University, pp. 10-14, 21-23, 25-31, and 51, Jul. 2008.

* cited by examiner

US 8,682,998 B2

METHOD AND SERVER CLUSTER FOR MAP REDUCING FLOW SERVICES AND LARGE DOCUMENTS

This application claims priority to India Application No. 1869/KOL/2008, filed 31 Oct. 2008, the entire contents of which is hereby incorporated by reference.

This application incorporates by reference computer program listings found in the computer program listing appendix deposited as part of the file for this application. The computer program listing appendix includes the following files that are referenced in the specification "Code Portion 1.ixt" (Created: 1/9/2014, Size: 1,657 Bytes), "Code Portion 2.txt" (Created: 1/9/2014; Size: 6,823 Bytes), "Code Portion 3.tXt" (Created: 1/9/2014; Size: 1,179 Bytes), "Code Portion 4.txt" (Created: 1/9/2014; Size: 2.2041 Bytes), "Code Portion 5.txt" (Created: 1/9/2014; Size: 2,886 Bytes). "Code Portion 6.txt" (Created: 1/9/2014; Size: 1,670 Bytes), "Code Portion 7.txt" (Created: 1/9/2014; Size: 619 Bytes), and "Code Portion 8.txt" (Created: 1/9/2014; Size: 11,685 Bytes).

1. TECHNICAL FIELD

The present invention relates to a method, a server cluster and a computer program for MapReducing the processing of large documents, for example Electronic Data Interchange (EDI) documents.

2. THE PRIOR ART

Modern software applications in an enterprise environment are typically structured into sub-programs each performing certain subtasks of the software application. Typically, huge amounts of data have to be processed by such applications, for example in the field of communication between applications of different enterprises, wherein large documents have to be sent and processed.

Such applications are often executed on integration servers, an example of which is the webMethods Integration Server of applicant. The Integration Server supports a graphical programming model FLOW, which is used for defining the processing logic of an Integration Server. FLOW allows for the graphical definition of a plurality of FLOW services as "black box" services as well as pipelines between the FLOW services, which serve to pass data from outputs of one FLOW service to inputs of another FLOW service. Since FLOW is a graphical programming language, it alleviates the developer from writing complex and error-prone conventional code. FLOW services may be used for processing any kind of information and for performing various kinds of computations.

A common approach known from the prior art for processing large documents by an Integration Server is to process the contents of the document in a sequential manner. However, since the size of the documents may be in the range of Gigabytes, such a sequential processing is very time-consuming and processing-intensive and may require special high-end hardware, whose maintenance is costly and complex.

Another approach known from the prior art is to employ a broker, which distributes the large documents to instances of an Integration Server in order to achieve some parallel processing. However, this approach requires additional and often complex messaging middleware for the communication between the broker and the Integration Server instances, which typically imposes high network bandwidth requirements and results in a high consumption of resources. Furthermore, this approach typically involves processing multiple large documents by the broker and the Integration Server instances, wherein each large document is still processed by a single Integration Servers in a sequential manner.

Furthermore, in the field of processing large input sets of data, a programming model and associated framework called MapReduce is known from the document "*MapReduce: Simplified Data Processing on Large Clusters*" by J. Dean et al. of Google, Inc. (OSDI'04: Sixth Symposium on Operating System Design and Implementation, San Francisco, December, 2004). A user-defined map function takes an input pair and produces a set of intermediate key/value pairs. The MapReduce library groups together all intermediate values associated with the same intermediate key and passes them to a user-defined reduce function. The reduce function accepts an intermediate key and a set of values. It merges together the values to form a possibly smaller set of values. Typically zero or one output value is produced per reduce invocation. The intermediate values are supplied to the user's reduce function via an iterator. This allows for handling lists of values that are too large to fit in memory. Programs written in this programming model may be automatically executed in parallel on different machines by the framework. However, employing the MapReduce programming model onto an existing application requires an in-depth adaptation of the programming logic of the application to conform to the MapReduce programming model. Furthermore, MapReduce is intended for the field of search engines, where specialized tasks such as counting words in huge collections of documents, building graph structures of web links and the like are common.

One concrete example of the processing of large documents is Electronic Data Interchange (EDI). EDI relates to the transmission of structured messages between applications by electronic means. EDI is typically used to transmit large documents such as invoices or purchase orders between applications of different enterprises. A number of standardized formats for the structured messages are known in the art, e.g. ANSI X12, UCS, VICS, UN/EDIFACT, ODETTE and EANCOM. Processing such large EDI documents typically involves the above-mentioned disadvantages.

The technical problem underlying the present invention is therefore in one aspect to provide a method and a system for processing large documents, in particular EDI documents, with less processing time and computing effort and thereby at least partly overcoming the above explained disadvantages of the prior art. Another but related technical problem underlying the present invention is to provide a method and a system for processing the input of a FLOW service with less processing time and computing effort, which is furthermore flexibly adaptable to existing programming logic with minimal adaptation efforts.

3. SUMMARY OF THE INVENTION

According to one aspect, the invention relates to a method for MapReducing the processing of an Electronic Data Interchange (EDI) document. In the embodiment of claim 1, the method comprises the steps of:

a. mapping the EDI document into a plurality of intermediate documents;
b. processing the intermediate documents to produce a plurality of intermediate results;
c. reducing the plurality of intermediate results to produce a plurality of reduced intermediate results; and
d. reducing the reduced intermediate results to produce a final result representing the processed EDI document.

The first aspect of the present invention is based on the realisation that the concept of MapReducing cannot only be used in the context of Search Engines but also advantageously for the processing of EDI documents in an enterprise environment. Accordingly, a large EDI document is at first mapped, i.e. split, into multiple intermediate documents. The mapping, i.e. splitting is preferably performed such that each resulting intermediate document has an approximately equally sized payload, i.e. so that it consumes a comparable amount of processing time and/or processing resources, when being processed in the further steps of the method.

The intermediate documents are then processed to produce a plurality of intermediate results, which is preferably performed in parallel to improve the processing performance in terms of overall processing time. Furthermore, since the EDI document is mapped to a plurality of, typically smaller, intermediate documents, the intermediate documents may be processed by commodity hardware, i.e. there is no need to employ specialized high-end hardware.

After the processing of the intermediate documents, the resulting intermediate results are reduced to produce a plurality of reduced intermediate results. Reducing means collating the related intermediate results into one reduced intermediate result. Related in this context means that two or more intermediate results stem from the same original EDI document.

Finally, the reduced intermediate results are reduced in a further step to produce a final result. This method step typically involves adequately combining the reduced intermediate results, in order to obtain the final result of the processing of the EDI document.

The described two-step reducing is especially advantageous, if the reducing steps are performed on different physical machines in order to achieve a parallelization. In this case, since the intermediate results are already reduced before being sent to another machine, which performs the second reducing step, valuable network bandwidth can be saved, since less results have to be transmitted between the machines. Furthermore, this aspect is especially advantageous if the reducing steps are commutative (i.e. A operation B is equivalent to B operation A) and/or associative (i.e. A operation (B operation C) is equivalent to (A operation B) operation C). Consequently, the reducing steps may be performed in parallel in any order. Another advantage associated with a two-step reducing is that the load, i.e. processing time for performing reduce step, may be shared between commodity machines, rather than one machine doing the reduce step over a large set. The second reduce step may thus be performed over a smaller set of intermediate results.

In another aspect of the present invention, the EDI document (1) may be mapped such that each of the intermediate documents (10, 11) comprises at least one of a plurality of interchange envelopes, at least one of a plurality of functional group envelopes and/or at least one of a plurality of transaction set envelopes of the EDI document (1). Accordingly, the mapping, i.e. splitting, may be performed at one of the boundaries defined by the structure of the EDI document, i.e. on transactional set envelope level, functional group envelope level and/or interchange envelope level. It typically depends upon the end user to define at what boundary the EDI document is to be split based on the structure of the EDI document. For example, if the functional groups and/or interchange envelopes contain the optimum number of transactions to define a reasonably sized payload.

Steps a. and d., i.e. the mapping and the final reducing, may be performed by a master server of a server cluster and steps b. and c., i.e. processing and reducing the intermediate documents or intermediate results, respectively, may be performed by a plurality of slave servers of the server cluster. Each slave server may process one or more intermediate documents and reduce one or more intermediate results. Performing the processing by a plurality of slave servers is especially advantageous, since the processing of the intermediate documents can be highly parallelized. The master and slave servers are preferably distinct physical machines communicating over a network connection.

For example if the processing task is to add a list of numbers $\{1, 2, 3, 4, 5, 6, 7, 8, 9, 10, 11, 12\}$, the master server may delegate the intermediate documents $\{1, 2\}$ to a slave node 1, $\{3, 4\}$ to a slave node 2, $\{5, 6\}$ to a slave node 3, $\{7, 8\}$ to slave node 1, $\{9, 10\}$ to the slave node 2 and $\{11, 12\}$ to the slave node 3. At the slave node 1, the intermediate results would then be sum of the intermediate documents: 3 corresponding to $\{1, 2\}$ and 15 corresponding to $\{7, 8\}$. The reduce step on the slave node 1 would then add 3 and 15, resulting to 18. Accordingly, the reduce step on the slave node 2 would add 7 and 19 to yield 26 and the slave node 3 would add 11 and 23 into 34. Consequently, only three reduced intermediate results, 18, 26, 34, would have to be transferred back to the master server, instead of transferring 3, 15, 7, 19, 11, 23. The final reduce step performed on the master server would then yield 78 (18+26+34), which is the desired result.

In another aspect, the method may further comprise the step of sending the intermediate documents to the slave servers by an asynchronous invocation from the master server. Accordingly, the master server takes the large EDI document and delegates the processing of the intermediate documents to the slave servers. The EDI document itself preferably stays with the master server. Asynchronous invocation means that once the master server invokes, i.e. triggers, the processing of a slave server, which is preferably performed by a thread pool of the master server, the master server threads do not wait for the slave servers to finish their processing (which would be a synchronous invocation), but that the master server may immediately proceed with its own processing, i.e. subsequently invoking further slave servers. This concept even more increases the processing speed of the present invention, since there are no master server resources which are blocked (i.e. waiting for the slave servers), thus resulting in a faster delegation of tasks to the slave servers.

Alternatively, the EDI document may be stored in a distributed file system accessible to the slave servers and the method may comprise the further step of sending, by the master server, a reference to the intermediate documents to the slave servers by an asynchronous invocation. If the slave servers are connected to the distributed file system over direct connections, this aspect may speed up the processing considerably, since it is not necessary to send the EDI document or the intermediate documents over a slow network connection. In this case, only a reference to the EDI document and/or the portions of the EDI document which is supposed to be processed by the slave (i.e. the intermediate documents) have to be passed to the slave nodes. Co-location (i.e. providing a reference to the portions which actually reside on the slave nodes itself) is especially advantageous since it saves a lot of bandwidth consumption, since no EDI data transfer happens between the machines.

When processing the intermediate documents, the slave servers preferably store the intermediate results locally, either in memory or in a persistent file system, which are then collected by the master server.

Furthermore, each of the intermediate results may comprise an identifier relating the respective intermediate result to the EDI document. Each of these intermediate invocation results may be tracked to the original invocation by the use of an identifier. The identifier may e.g. be a counter which is increased with every original invocation with a large EDI document. The identifier may be used to allow for asynchronous behaviour when the master server calls the slave servers. This aspect may free the delegating threads at the master server (which in synchronous mode would have waited for the slave servers to perform their processing), thus leading to a better resource utilization at the master server and indirectly leading to more parallelization. When the master server delegates the intermediate results to the slave servers in an asynchronous manner, the slave servers thus have a means to track their obtained intermediate results back to the original invocation from the master server. For example, if there is a large EDI document to be processed, an identifier "12345" may be created for the invocation. The method may pass this identifier to the slave servers, while delegating the intermediate documents to the slave servers. This helps in relating all the intermediate results to the original EDI document in the subsequent reduce steps, as at the slave servers the intermediate results may be maintained with this identifier.

Additionally or alternatively, a processing logic adapted for performing the processing of the slave servers in step b. may be distributed to the slave servers during runtime. Accordingly, the slave servers do not have to have copies of the executables, i.e. the processing logic, which execute the EDI document. The executables may for example be comprised in a library of the master server and spread to the slave servers at runtime. The spreading is preferably performed depending on the executables needed for the current EDI document. Any peer to peer framework or proprietary mechanism may be used to share the executables.

Furthermore, the present invention relates to a server cluster comprising a master server and a plurality of slave servers adapted for performing any of the methods presented above.

In yet another aspect of the present invention, a method for MapReducing the processing of at least one input of a FLOW service is provided. In the embodiment of claim 9, the method comprises the steps of:

a. mapping the at least one input of the FLOW service into a plurality of intermediate inputs by a mapper service;
b. executing a plurality of instances of the FLOW service, the instances of the FLOW service processing the intermediate inputs to produce a plurality of intermediate results;
c. reducing the intermediate results into a plurality of reduced intermediate results by a plurality of first reducer services; and
d. reducing the reduced intermediate results to produce a final output of the FLOW service from the reduced intermediate results by a second reducer service.

Accordingly, a FLOW service, either a newly created or an existing FLOW service, does not process its inputs in a sequential manner, but the processing of the FLOW service is effectively "parallelized" by the above method. Therefore, the inputs of the FLOW service are not directly fed into the FLOW service as commonly performed, but are first split by a mapper service into a plurality of intermediate inputs. In an embodiment the FLOW service itself is "cloned", i.e. the intermediate inputs are processed by a plurality of instances of the FLOW service, preferably in parallel. The resulting intermediate results are then reduced by a plurality of first reducer services in order to obtain one reduced intermediate result for each instance of the FLOW service. Finally, the reduced intermediate results are reduced by a second reducer service in order to provide the final output of the FLOW service. Preferably, the second reducer service is based on the same implementation than the first plurality of reducer services, i.e. all reducing steps are performed by instances of the same reducer service. In the following, the terms "reducer service" and "instance of the reducer service" are used synonymously for the sake of clarity. It is to be noted that the overall input and output of the FLOW service stays the same, only the processing is parallelized.

In one aspect, the mapper service and the second reducer service are executed on a master server of a server cluster and wherein the plurality of instances of the FLOW service and the plurality of first reducer services are executed on a plurality of slave servers of the server cluster.

In another aspect, an input signature of the mapper service conforms to an input signature of the FLOW service. Additionally or alternatively, an output signature of the reducer service conforms to an output signature of the FLOW service. An input signature (or an output signature) preferably defines the number and type of arguments provided as input (or as output) of a service, hence defining the interface of the service.

Due to the fact that the input signature of the mapper service preferably conforms to the input signature of the FLOW service to be parallelized, any existing FLOW service may be connected to a mapper service with the same input signature. Furthermore, any existing FLOW service may be connected to a reducer service with a conforming output signature, which means that any existing FLOW service may be embedded in the present method without the need to adapt its input or output signature or internal processing logic. This is especially advantageous, since it highly increases the flexibility and applicability of the present invention. An example of input and output signature is presented in the detailed description below.

In yet another aspect, at least one input of the FLOW service may comprise an Electronic Data Interchange (EDI) document. Hence, the FLOW service is in this aspect preferably adapted for processing the EDI document. When the FLOW service is parallelized, an especially efficient processing of the EDI document may be achieved similar to the aspects presented further above. However, it should be appreciated that FLOW services are not at all restricted to processing EDI documents. On the contrary, FLOW services are suitable for processing any kind of documents, such as XML documents for example. Furthermore, not only documents may be processed by FLOW services, but any kind of computation logic may be implemented.

The present invention also relates to a server cluster comprising a master server and a plurality of slave servers adapted for performing any of the above presented methods.

Lastly, a computer program is provided comprising instructions adapted for implementing any of the above described methods.

4. SHORT DESCRIPTION OF THE DRAWINGS

Figure 2:
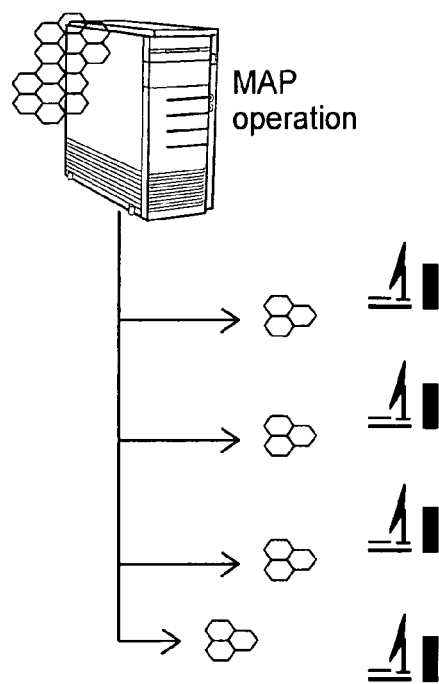
Figure 3:
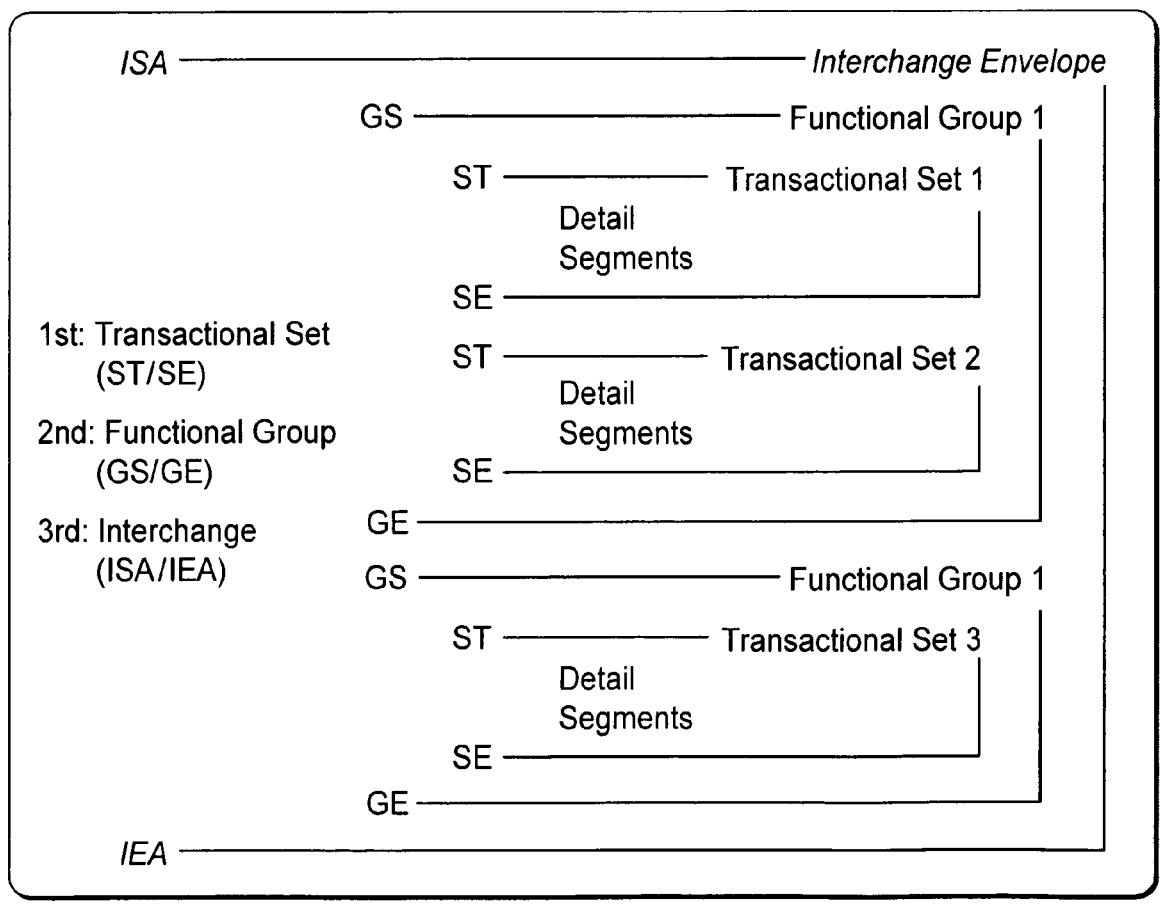
Figure 4:
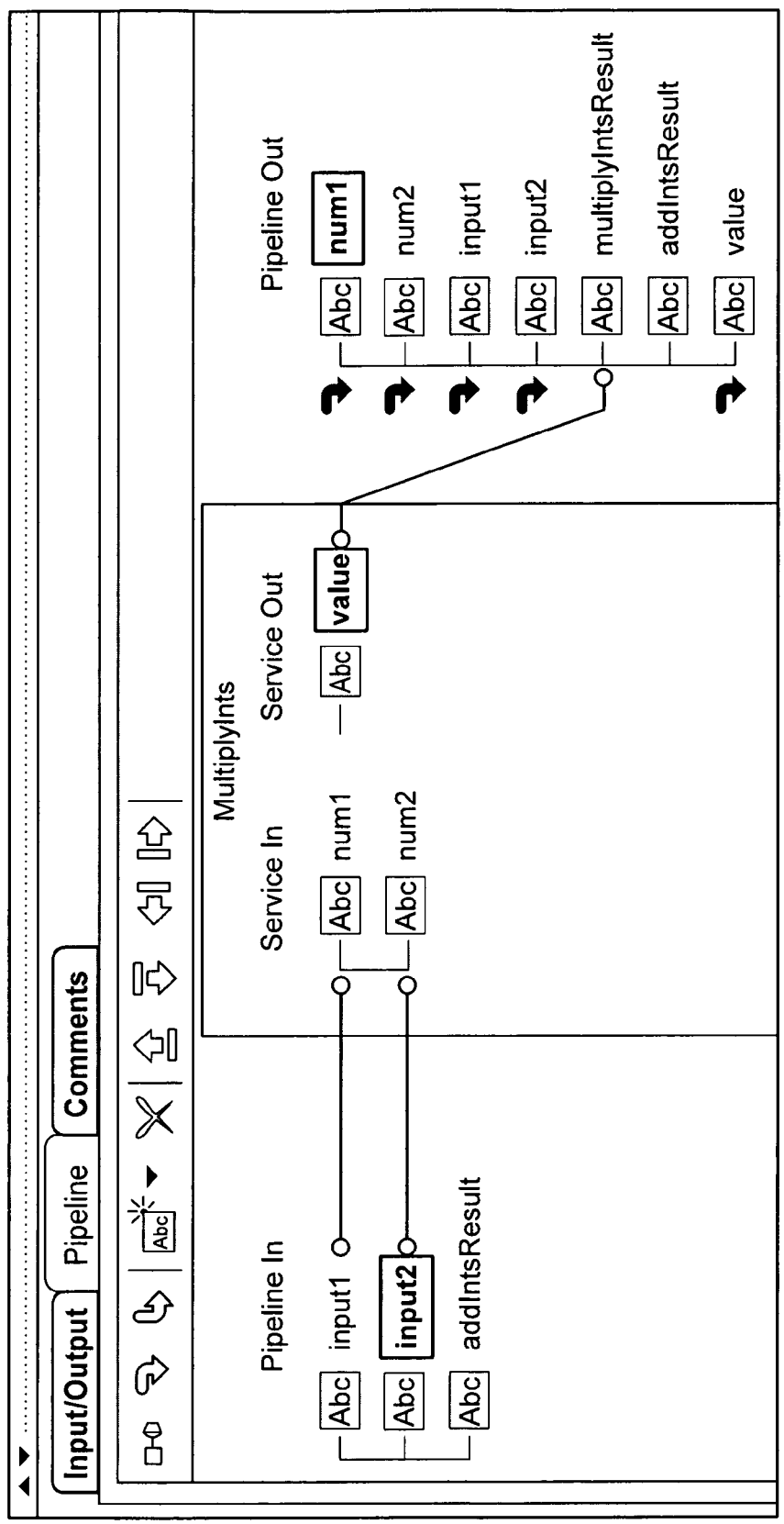
Figure 5:
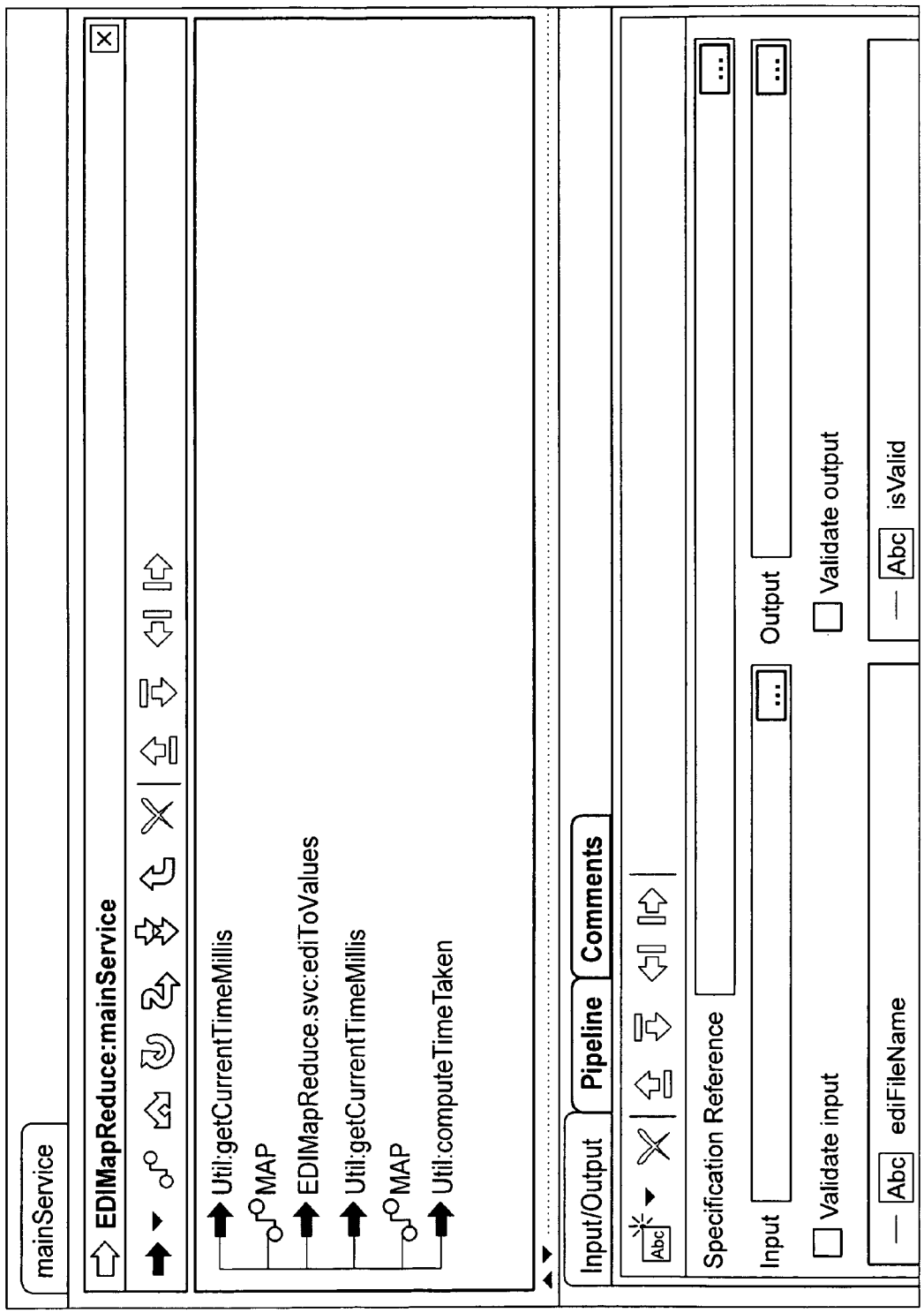
Figure 6:
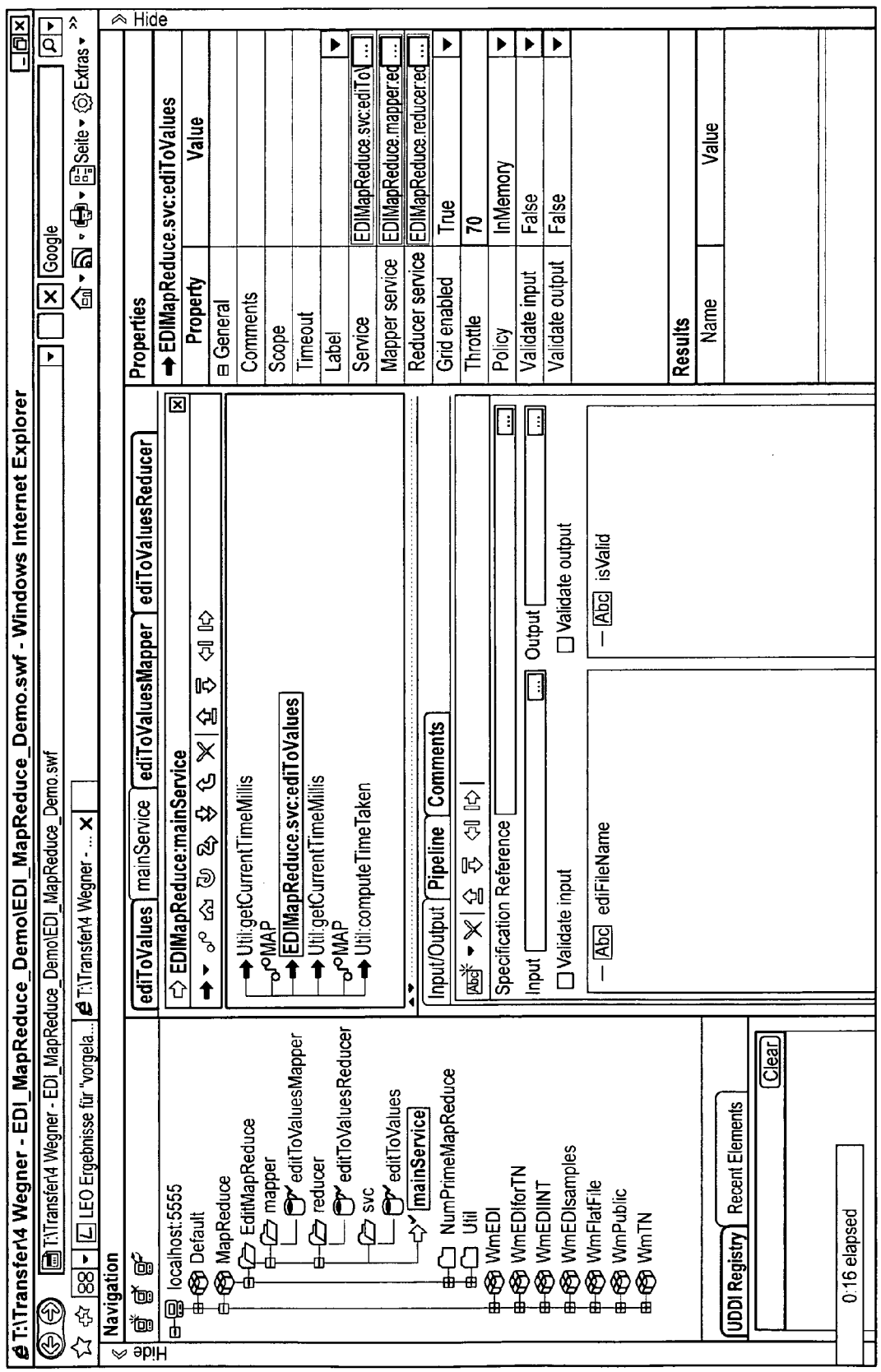

In the following detailed description, presently preferred embodiments of the invention are further described with reference to the following figures:

FIG. 1: A schematic overview of an embodiment of the present invention;

FIG. 2: A schematic overview of a master server and a plurality of slave servers according to an embodiment of the present invention;

FIG. 3: An overview of the structure of an EDI document;

FIG. 4: An exemplary FLOW service and its related input and outputs;

FIG. 5: Another exemplary FLOW service for processing an EDI document;

FIG. 6: An overview of a graphical user interface for specifying the properties of a MapReduced FLOW service; and FIG. 7: A class diagram of an exemplary implementation of a method of the present invention.

5. DETAILED DESCRIPTION

In the following, a presently preferred embodiment of the invention is described with respect to the processing of a large EDI document by a server cluster according to the present invention. A server cluster, also referred to as a grid as schematically shown in FIG. 2, is a distributed computing platform which allows for parallel processing. It is typically composed of a cluster of networked, loosely coupled computers acting in concert to perform very large computing or data intensive tasks. It should be appreciated that processing an EDI document is only one of a wide variety of scenarios for the present invention and that any other types of documents may be processed. Furthermore, not only document processing may be advantageously achieved by the present invention, but any kind of complex computations, as will be demonstrated in further exemplary embodiments below.

The general structure of an EDI document is schematically depicted in FIG. 3, which shows the structure as defined for example by the ANSI ASC X12 standard. Accordingly, an EDI document comprises any number of transactions, which are grouped by various envelopes. On the innermost level, a transaction set is identified by the ST/SE segments shown in FIG. 3. The ST segment preferably comprises a transaction set ID, a control number and an optional implementation convention reference. The SE segment preferably comprises the number of included segments in the transaction set and the same control number as the ST segment. The second level of enveloping is the functional group envelope. Its purpose is to group similar types of transaction sets within a transmission. ANSI ASC X12 defines a number of business processes for grouping similar transaction sets, like Planning Schedule (830), Purchase Order (850), Purchase Order Acknowledgment (855), Purchase Order Change (865), Order Status Inquiry (869) or Order Status Report (870).

The outermost level is the interchange envelope that is defined by ISA and IEA segments (see FIG. 3). An Interchange envelope preferably encloses the data from one sender to one receiver. The ISA segment is preferably a fixed length segment. Some items contained in the ISA/IEA segments are structured mailbox addresses of the sender and receiver, interchange control numbers, counts of the functional groups within the interchange envelope, time/date stamps and the version of the interchange envelope.

Typical ways to process such an EDI document might be to map the data of the EDI document to another format (e.g., the format that a back-end system requires) or to map data from the EDI document to the inputs of a FLOW service, as further outlined below.

Traditional EDI processing typically processes one transaction at a time. If the EDI document size is in the order of hundreds of megabytes or gigabytes, this processing is very time consuming. To somewhat alleviate this disadvantage, typically a cluster of high-end servers are deployed to process each of a plurality of EDI documents in parallel. The employment of high-end servers, however, has severe disadvantages, e.g. an increased complexity if hardware/software fails during the processing and an increased cost of ownership for maintaining the high-end servers.

The present invention defines a method and server cluster for parallelizing the processing of on EDI document-level. As can be seen in FIG. 1, a master server M1 at first receives a large EDI document 1. The EDI document is at first mapped, i.e. split, on the interchange envelope boundaries into a plurality of intermediate documents 10, 11. However, it should be appreciated that an EDI document may in further embodiments of the present application as well be split for example at the functional group envelope level or even at the transaction set envelope level, depending on the type of EDI document.

Even more fine-grained approaches are suitable with the present invention, for example splitting the EDI document at the single transaction level, if the transactions in the EDI document are independent entities. As a result the document could be mapped (chunked) into very small portions leading to a high level of parallelization.

After splitting the EDI document, the master server M1 delegates the intermediate documents 10, 11 to a plurality of slave servers S1, S2 for processing. The slave servers S1, S2 process the intermediate documents 10, 11 and produce intermediate results 20-23. It should be noted that each processing of one intermediate document may result in multiple intermediate results, as further explained below.

The intermediate results 20-23 are then reduced by each of the slave servers S1, S2 in order to preferably obtain one reduced intermediate result 30, 31 per slave server S1, S2.

When the master server M1 has finished delegating the intermediate documents to the slave servers S1, S2, it preferably issues reduce calls on each of the slave servers S1, S2. The delegation is preferably invoked in an asynchronous manner, so that the master server M1, i.e. its threads, may proceed with its processing and does not have to wait for each slave server S1, S2 to finish execution, as already explained above.

The reduce calls issued by the master server M1 trigger the slave servers S1, S2 to send their respective reduced intermediate results 30, 31 back to the master server M1. The master server M1 then issues another reduce call for collating the collected reduced intermediate results 30, 31 into one final output 2. The output 2 then represents the processed EDI document 1.

It is to be noted that, since the slave servers S1, S2 each process only a portion of the overall EDI document 1, there is no need for specialized high-end hardware. Commodity machines may be used as slave servers, which greatly reduces the cost of the overall architecture.

The processing of the master and slave servers is preferably performed by a number of services. Particularly preferred is an embodiment where the servers are webMethods Integration Serves. The webMethods Integration Server is at the core of the webMethods portfolio of products of Applicant. It is a Java based, multi-platform enterprise Integration engine supporting the execution of services to perform integration logic such as data mapping and communication with other systems. The Integration Server provides a graphical programming model FLOW that is used for performing common integration tasks such as mapping, invoking other services, looping and branching. Some of the Integration Server features include writing graphical FLOW and java services, defining and modifying documents and mapping logic, testing, debugging and executing services, creating and configuring web services and editing adapter services and notifications.

FIG. 4 depicts an exemplary simple FLOW service "sampleFlowService" which takes two integers "input1" and "input2" and provides two outputs "multiplyIntsResult" (the result of a multiplication of the two input integers) and "addIntsResult" (the result of an addition of the two input integers). When executing the exemplary FLOW service on the Integration Server, the user may be provided with a dialog to enter values for the inputs and another dialog may be presented which comprises the computation results. FIG. 4 shows a graphical user interface preferably used by the developer for specifying the mapping between the inputs, the FLOW service and the outputs.

Another example of FLOW service processing is to count the occurrences of words in a file. A common approach without parallelization would be to read the file line by line, to add the word as a key in a HashMap and the count as a value in the HashMap. First the HashMap is queried for the key and if the query returns "null", the count is put as 1. Otherwise the original count is retrieved and it will be incremented and put back in to the HashMap. When the mapper M10 and reducer services R10, R11, R20 are written, the mapper service may produce smaller files as the output and the reducer services only combine the output HashMap with a final HashMap. Accordingly, the input/output signature of the original FLOW service which does the word count remains the same and only the logic of the mapper and the reducer operation have to be written. This is an especially advantageous aspect of the present invention, as further explained below.

Yet another example of a FLOW service is the processing of an EDI document. FIG. 5 shows an exemplary FLOW service "mainService", which takes an EDI file name as input. It converts the EDI file format to an internal webMethods format by calling the service "ediToValues" also depicted in FIG. 5. As an output, it returns if the input EDI file is valid as a whole after the conversion. It may further indicate the consumed processing time for execution of the service (not shown in FIG. 5). The input/output signature of the FLOW service "ediToValues" is structured as follows: It accepts either an input "ediFileName" (the file name of the EDI document) or an input "edidata" (the actual EDI data itself represented as string) which are mutually exclusive. If a "printTime" input is set, the time taken to execute the service will be printed out. A single output "isValid" will be output indicating if the EDI document is valid or not after the conversion.

Since processing the above described FLOW service "ediToValues" sequentially consumes a great amount of processing time and resources, it is demonstrated in the following how the method of the present invention is applied onto this existing FLOW service in order to efficiently and flexibly "parallelize" it.

Referring to FIG. 6, in the properties panel of the FLOW service "ediToValues", the developer may provide the following properties:

Mapper service: a valid Integration Server service for mapping the input data
Reducer service: a valid Integration Server service for reducing the output data
Grid enabled: set to "true"
Throttle: the maximum number of parallel executions including the master and the slave servers
Policy: this property specifies whether to hold the intermediate results of the slave servers in memory (if they are of negligible size), or persist them in a file The present invention then uses the above-specified mapper service M10 (see, FIG. 1) to perform the mapping of the EDI document 1 into the plurality of intermediate documents 10, 11. The input and output signature of the mapper service M10 preferably follows certain rules:

The input of the mapper service is preferably the same as the FLOW service being "parallelized" ("ediToValues" in the example). In this case, the mapper service accepts an input "ediFileName" which matches with the input of the service "ediToValues".

The output of the mapper service is preferably wrapped in an Integration Server document with name "serviceInputData". The content of "serviceInputData" is preferably the input of the "parallelized" FLOW service. In the example, the output "edidata" of the mapper service matches with the input of the service "ediToValues".

Furthermore, the output of the mapper service preferably provides a boolean "isLastSplit". The mapper service sets this value to "true" when it processes the last mapping step. The mapper service may then be repeatedly called until this value is set to "true".

The input and output signature of the reducer service R10, R11, R20 preferably also follows certain rules:

The input of the reducer service is wrapped in an Integration Server document list called "reduceInputData". The document list is preferably an array of documents. The content of each entry in the document list may be the output of the FLOW service to be "parallelized". In the example, an input "isValid" of the reducer service matches with the output of the service "ediToValues".

The input of the reducer service may further provide a boolean "isLastReduceStep". This value is set to true if the reducer processes the last reduce call. This can be used to perform cleanup activities in the reducer service.

The output of the reduce service should be the output of the service that is to be "parallelized". In the example, the output "isValid" matches with the output of the service "ediToValues".

As can be seen, the input and output signatures of the mapper and reducer services defined above conform to the input and output signature of the FLOW service. This has the advantage that any existing FLOW service may be easily "parallelized", since neither the signature nor the internal processing of the FLOW service itself have to be adapted. Instead, the mapper and reducer services are simply "plugged in" before and after the FLOW service, respectively.

The above presented approach may be especially advantageously applied, if the reduce operations are associative and commutative. For example, when calculating the amount of prime numbers in a range of 1 to 100, two input splits may be employed; the first input split being 1 to 50 and the second input split being 51 to 100. The intermediate outputs in this example would be "x" and "y" representing the number of prime numbers in both splits, respectively. The reduce operation would do the addition, which is associative and commutative.

The above-presented signature conformance is one of the advantages of the present invention over the conventional MapReduce algorithm known from the prior art. While the conventional MapReduce map step written by the user takes an input pair and produces a set of intermediate key/value pairs, the mapper service on the Integration Server according to the present invention follows a standard signature and only "chunks", i.e. splits, the input data. Furthermore the conventional MapReduce map step is typically run on slaves that take an input pair and produce a set of intermediate key/value pairs, wherein the mapper service on the Integration Server preferably executes on the master server M1, which then delegates the chunked input data to the slave servers S1, S2 for executing the actual services. This is especially flexible and results in an easy development and maintenance of flow services for a number of reasons: in the conventional MapReduce algorithm, there is no service which is "parallelized", but it is rather a programming construct which is defined through mappers and reducers, which perform the desired operation. Unlike in the Integration Server, there is no service which corresponds to the desired operation. This makes the claimed method understandable and especially user-friendly.

Concerning the conventional MapReduce reduce step written by the user, it takes an intermediate key and a set of values for the key and merges the values to form a possibly smaller set of values. On the contrary, when the reducer service is executed on the Integration Server according to the present invention, the master server M1 preferably issues a reduce call to all the slave servers S1, S2 to collate the related intermediate results. When the master server M1 gets back the results from the slave servers S1, S2 after the reduce operation in each of the slave servers S1, S2, it internally combines the results into one final result on the master server M1. This essentially makes the reduce operation a two-step process performed first on the slave servers S1, S2 and then on the master server M1, which saves network bandwidth and thus leads to a further decreased processing time and better utilization of resources, as already explained above.

Further features of the server cluster of the present invention are possible. The master Integration Server may for example maintain a configuration file which comprises a list of available slave servers. It may comprise the required information needed by the master to delegate the processing to slave servers. This simple facility can be easily extended to achieve a dynamic identification of the slave nodes. For example, when a slave server starts up, it may broadcast its identification to all the machines in the server cluster and the master server can identify the slave server as a potential slave.

Figure 7:
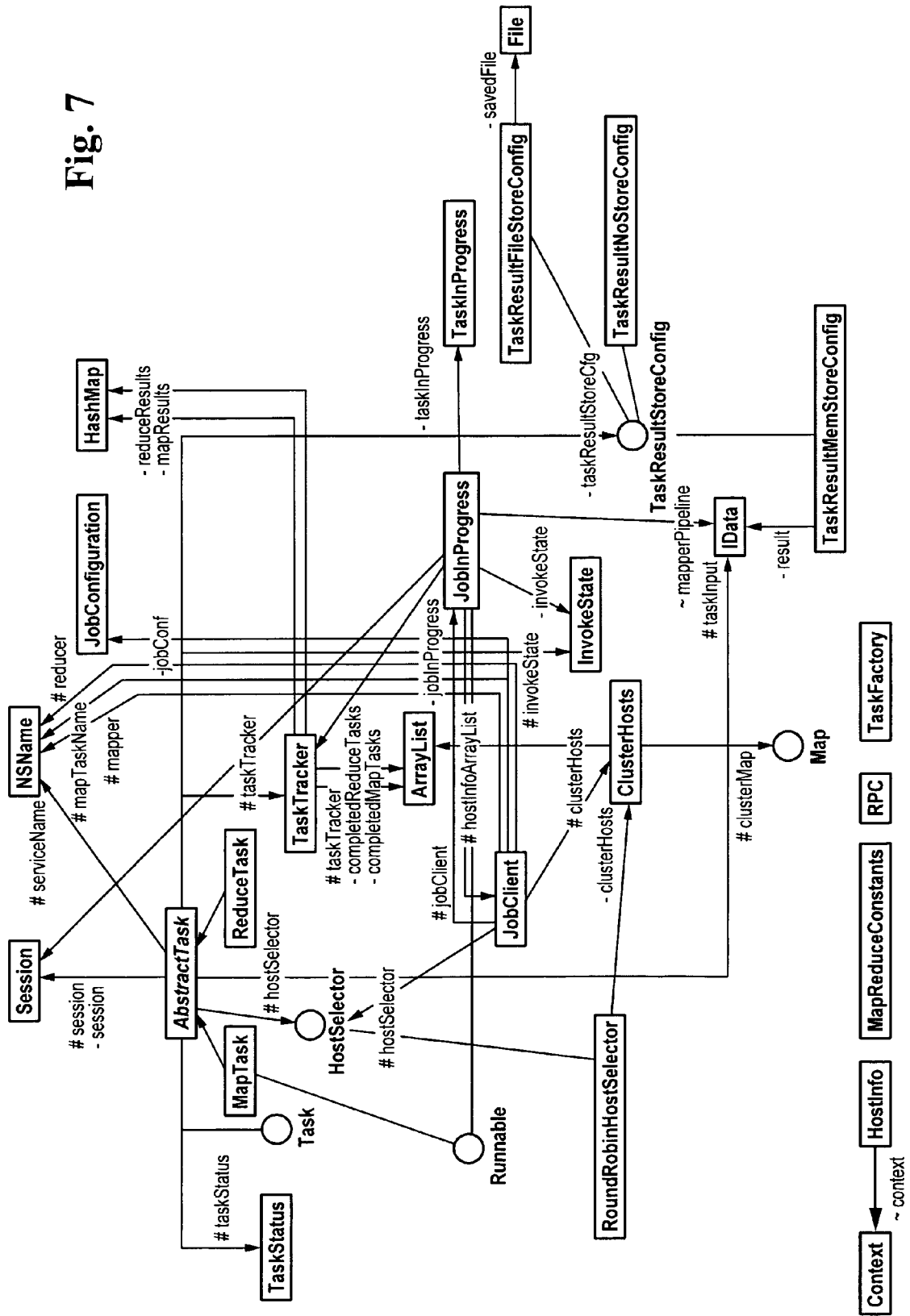

In the following, an exemplary Java implementation of an embodiment of the present invention is presented, the main components of which are depicted in FIG. 7. However, it should be appreciated that the present invention is neither restricted to the programming language Java nor to the concrete implementation shown in the following.

The class JobClient shown in FIG. 7 serves for defining a "job", which represents one execution of a processing of data according to the present invention. An exemplary implementation of JobClient is shown in "Code Portion 1.txt" file of the incorporated computer program listing appendix.

As can be seen, when a new instance of JobClient is created by invoking its constructor (cf. p. 21, line 1), it takes as input the parameters mapper (the mapper implementation to be used for the current job), reducer (the reducer implementation to be used), throttle (the number of desired parallel service executions) and isPersistMapIntResult (whether the intermediate results should be stored in the memory of the slaves or in a persistent file system). When invoking the submit-Job( )-method (cf. p. 21, line 30), this method takes a pipeline parameter of type IData, which preferably comprises the input data to be processed, e.g. the data of the EDI document. submitJob( ) then creates a new JobInProgress instance and invokes its executeAndTrackJob( )-method.

An exemplary implementation of JobInProgress is shown in the "Code Portion 2.txt" file of the incorporated computer program listing appendix.

As can be seen, JobInProgress's run( )-method in this example comprises the main code for processing the input file, i.e. the steps of splitting (cf. p. 24, line 29), executing the "parallelized" flow services (cf. p. 25, line 8) and reducing (cf. p. 26, line 24).

An exemplary implementation of MapTask, which performs the mapping, is shown in the "Code Portion 3.txt" file of the incorporated computer program listing appendix.

As can be seen, when a MapTask is executed, i.e. when its run( )-method is invoked, MapTask invokes the remoteInvoke( )-method (p. 30, line 21) of the RPC class, which takes three input parameters: hostSelector.getHostInfoEntry( ), ser-viceName and taskInput. taskInput is an attribute inherited from the superclass AbstractTask and preferably comprises the input to be processed, e.g. the data of the EDI document.

An exemplary implementation of RPC and its remoteInvoke method is shown in the "Code Portion 4.txt" file of the incorporated computer program listing appendix.

An exemplary implementation of ReduceTask is shown in the "Code Portion 5.txt" file of the incorporated computer program listing appendix.

Both MapTask and ReduceTask have the abstract class AbstractTask as superclass, i.e. they inherit its attributes and set- and -get-methods, which are shown in "Code Portion 6.txt" file of the incorporated computer program listing appendix.

As can be seen, AbstractTask itself implements the interface Task, an exemplary implementation of which is shown in the following "Code Portion 7.txt" file of the incorporated computer program listing appendix.

A number of further infrastructure classes and interfaces are required in the exemplary implementation of the present invention, which are shown in the following "Code Portion 8.txt" file of the incorporated computer program listing appendix.

The invention claimed is:

1. A method for adapting execution of a pre-existing service that includes a predefined internal processing logic that, when executed on a processing system, is configured to process an Electronic Data Inter-change (EDI) document, the pre-existing service also including a predetermined input signature and a predetermined output signature, the method comprising:

accepting the EDI document as input through a mapper service, the input to the mapper service conforming to the predetermined input signature of the pre-existing service;

(a) mapping the EDI document, via the mapper service, into a plurality of intermediate documents;

(b) processing the intermediate documents on a plurality of instances of the pre-existing service, to produce a plurality of intermediate results, each one of the plurality of intermediate results conforming to the predetermined output signature of the pre-existing service, each one of the plurality of instances executing processing that is based on the predefined internal processing logic of the pre-existing service;

(c) reducing the plurality of intermediate results, via a first reducer service, to produce a plurality of reduced intermediate results; and (d) reducing the reduced intermediate results, via a second reducer service, to produce a final result representing a result of processing the EDI document, the result conforming to the predetermined output signature of the pre-existing service, wherein the predefined internal processing logic of the pre-existing service is different from processing logic in the mapper service, the first reducer service, and the second reducer service, wherein the pre-existing service is defined independently of the mapper service, the first reducer service, and the second reducer service, and wherein the executed processing of the plurality of instances is performed without having to rewrite the internal processing logic of the pre-existing service upon which the executed processing is based.

2. The method of claim 1, wherein the EDI document is mapped such that each of the intermediate documents comprises at least one of a plurality of interchange envelopes, at least one of a plurality of functional group envelopes and/or at least one of a plurality of transaction set envelopes of the EDI document.

3. The method of claim 1, wherein (a) and (d) are performed by a master server of a server cluster and wherein (b) and (c) are performed by a plurality of slave servers of the server cluster, each slave server processing one or more intermediate documents and reducing one or more intermediate results.

4. The method of claim 3, further comprising sending the intermediate documents to the slave servers from the master server by an asynchronous invocation.

5. The method of claim 3, wherein the EDI document is stored in a distributed file system accessible to the slave servers and wherein the method further comprises sending a reference to the intermediate documents to the slave servers from the master server by an asynchronous invocation.

6. The method of claim 1, wherein each of the intermediate results comprises an identifier relating the respective intermediate result to the EDI document.

7. The method of claim 1, wherein a processing logic for performing the processing of the slave servers in (b) is distributed to the slave servers during runtime.

8. A server cluster comprising a master server and a plurality of slave servers configured to perform the method of claim 1.

9. A method for adapting execution of a pre-existing FLOW service that includes to a predetermined input signature, a predetermined output signature, and a predetermined internal processing logic, the method comprising:
accepting input through a mapper service, the input to the mapper service conforming to the predetermined input signature of the pre-existing FLOW service;
mapping the input, via the mapper service, to a plurality of intermediate inputs;
dynamically parallelizing the pre-existing FLOW service by instantiating a plurality of instances of the FLOW service, each one of the plurality of instances having an input signature and output signature that respectively conform to the predetermined input and output signature of the pre-existing FLOW service;
sending the plurality of intermediate inputs to the plurality of instances;
executing the plurality of instances with the intermediate inputs, the processing in the respective instances performed via processing logic that is substantially the same as the predetermined internal processing logic, to thereby produce a plurality of intermediate results for each one of the plurality of instances;
reducing the plurality of intermediate results for each instance in the plurality of instances into a plurality of reduced intermediate results via a first reducer service;
reducing the plurality of reduced intermediate results to produce a final output via a second reducer service, the final output conforming to the predetermined output signature; and
outputting the final output from the second reducer service,
wherein the predetermined internal processing logic of the pre-existing FLOW service is different from processing logic in the mapper service, the first reducer service, and the second reducer service,
wherein the pre-existing FLOW service is defined independently of said mapping and said reducing, and
wherein the processing logic in the respective instances is executed without having to rewrite the predetermined internal processing logic upon which said processing logic is based.

10. The method of claim 9, wherein the mapper service and the second reducer service are executed on a master server of a server cluster and wherein the plurality of instances of the FLOW service and the plurality of first reducer services are executed on a plurality of slave servers of the server cluster.

11. The method of claim 9, wherein the first predetermine input signature includes an Electronic Data Interchange (EDI) document.

12. A server cluster comprising a master server and a plurality of slave servers configured to perform the method of claim 9.

13. A non-transitory computer readable-storable medium storing computer readable instructions the stored instructions comprising instructions configured to perform the method of claim 1.

14. A non-transitory computer readable-storable medium storing computer readable instructions for performing a MapReduce method in association with a pre-existing FLOW service that includes a predetermined input signature, a predetermined output signature, and a predefined internal processing structure that is configured to process input that is in conformance with the predetermined input signature and provide output in conformance with the predetermined output signature, the stored instructions comprising instructions configured to:
accept input through a mapper service, the input to the mapper service conforming to the predetermined input signature of the pre-existing FLOW service;
map the input, via the mapper service, to a plurality of intermediate inputs;
dynamically parallelize the pre-existing FLOW service by instantiating a plurality of instances of the FLOW service, each one of the plurality of instances having an input signature and output signature that respectively conform to the predetermined input and output signature of the pre-existing FLOW service;
send the plurality of intermediate inputs to the plurality of instances;
execute the plurality of instances to process the intermediate inputs to thereby produce a plurality of intermediate results for each one of the plurality of instances, the execution of the plurality of instances including performing processing that is based on the predefined internal processing logic of the pre-existing FLOW service;
reduce the plurality of intermediate results for each instance in the plurality of instances into a plurality of reduced intermediate results via a first reducer service;
reduce the plurality of reduced intermediate results to produce a final output via a second reducer service, the final output conforming to the predetermined output signature; and
output the final output,
wherein the predetermined internal processing logic of the pre-existing FLOW service is different from processing logic in the mapper service, the first reducer service, and the second reducer service,
wherein the pre-existing FLOW service is defined independently of said mapping, said reducing, the mapper service, the first reducer service, and the second reducer service, and
wherein the performed processing in the plurality of instances is done without having to rewrite the predefined internal processing logic of the pre-existing FLOW service.

* * * * *